US012113690B2

(12) United States Patent
Reddy

(10) Patent No.: US 12,113,690 B2
(45) Date of Patent: Oct. 8, 2024

(54) NETWORK PATH HEALTH SCORING BASED ON LOAD BINNED LATENCY DATA

(71) Applicant: Palo Alto Networks, Inc., Santa Clara, CA (US)

(72) Inventor: Gopal Gadekal Reddy, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 94 days.

(21) Appl. No.: 17/811,608

(22) Filed: Jul. 11, 2022

(65) Prior Publication Data

US 2023/0099723 A1 Mar. 30, 2023

Related U.S. Application Data

(60) Provisional application No. 63/261,571, filed on Sep. 23, 2021.

(51) Int. Cl.
| | | |
|---|---|---|
| G06F 15/173 | (2006.01) | |
| H04L 43/062 | (2022.01) | |
| H04L 43/067 | (2022.01) | |
| H04L 43/0829 | (2022.01) | |
| H04L 43/0852 | (2022.01) | |
| H04L 43/0864 | (2022.01) | |

(Continued)

(52) U.S. Cl.
CPC ........ *H04L 43/0841* (2013.01); *H04L 43/062* (2013.01); *H04L 43/067* (2013.01); *H04L 43/0852* (2013.01); *H04L 43/0864* (2013.01); *H04L 43/0882* (2013.01); *H04L 43/106* (2013.01); *H04L 43/50* (2013.01)

(58) Field of Classification Search
CPC . H04L 43/0841; H04L 43/062; H04L 43/067; H04L 43/085; H04L 43/0864; H04L 43/0882; H04L 43/106; H04L 43/50
USPC ........................................................ 709/223
See application file for complete search history.

(56) References Cited

U.S. PATENT DOCUMENTS

| | | | |
|---|---|---|---|
| 10,897,424 B1 * | 1/2021 | Dhanabalan | ............ H04L 43/08 |
| 11,405,284 B1 | 8/2022 | Evans et al. | |

(Continued)

FOREIGN PATENT DOCUMENTS

| | | |
|---|---|---|
| EP | 1811683 A2 | 7/2007 |
| WO | 2008001157 A1 | 1/2008 |

OTHER PUBLICATIONS

EP Application No. 22197084.1, Extended European Search Report mailed Feb. 3, 2023, 8 pages.

(Continued)

*Primary Examiner* — Alan S Chou
(74) *Attorney, Agent, or Firm* — Gilliam IP PLLC

(57) ABSTRACT

A network path scoring system is disclosed herein that scores quality of network paths to facilitate identification of poorly performing network paths or circuits for investigation. The scoring system builds a profile of additional latencies of a network path binned by circuit load based on historical latency data for the network path. The additional latencies are determined with respect to a base latency of the network path. The network path scoring system determines a weighted average of the additional latencies of a subset of the load bins and a weighted average of expected latencies of the subset of load bins, and a score is calculated with these weighted averages.

25 Claims, 12 Drawing Sheets

(51) Int. Cl.
     *H04L 43/0882*    (2022.01)
     *H04L 43/106*     (2022.01)
     *H04L 43/50*      (2022.01)

(56) References Cited

U.S. PATENT DOCUMENTS

| | | | |
|---|---|---|---|
| 2015/0195171 A1* | 7/2015 | Mermoud | H04L 43/106 370/253 |
| 2017/0339059 A1* | 11/2017 | Averi | H04L 47/6275 |
| 2018/0262414 A1* | 9/2018 | Burbridge | H04L 43/50 |
| 2018/0270141 A1* | 9/2018 | Burbridge | H04L 43/50 |
| 2018/0279108 A1 | 9/2018 | So et al. | |
| 2019/0041835 A1* | 2/2019 | Cella | H04L 1/0041 |
| 2019/0109776 A1* | 4/2019 | Li | H04L 41/0895 |
| 2020/0296051 A1* | 9/2020 | Huiban | H04L 43/0817 |
| 2020/0344163 A1 | 10/2020 | Gupta et al. | |
| 2020/0391766 A1 | 12/2020 | Wang et al. | |
| 2023/0088062 A1 | 3/2023 | Reddy | |
| 2023/0091734 A1 | 3/2023 | Reddy | |
| 2023/0101314 A1 | 3/2023 | Reddy | |
| 2023/0105896 A1* | 4/2023 | Bienas | H04W 28/0268 370/235 |

OTHER PUBLICATIONS

U.S. Appl. No. 17/811,603, Non-Final Office Action mailed Mar. 4, 2024, 28 pages.

* cited by examiner

| circuit_name | down_bw_mbps | up_bw_mbps | time | ingress_pkt_loss_pct | circuit_utilization_pct |
|---|---|---|---|---|---|
| circuit_A | 50 | 50 | 2020-03-09 00:00:00 | | 7 |
| circuit_A | 50 | 50 | 2020-03-09 00:01:00 | 0.17 | 7 |
| circuit_A | 50 | 50 | 2020-03-09 00:02:00 | 0.33 | 7 |
| circuit_A | 50 | 50 | 2020-03-09 00:03:00 | 0.33 | 7 |
| circuit_A | 50 | 50 | 2020-03-09 00:04:00 | 0.33 | 5 |
| circuit_A | 50 | 50 | 2020-03-09 00:05:00 | 0.33 | 7 |
| circuit_A | 50 | 50 | 2020-03-09 00:06:00 | 0.5 | 7 |
| circuit_A | 50 | 50 | 2020-03-09 00:07:00 | 0.67 | 10 |
| circuit_A | 50 | 50 | 2020-03-09 00:08:00 | 0 | 7 |
| circuit_A | 50 | 50 | 2020-03-09 00:09:00 | 0.33 | 10 |
| circuit_A | 50 | 50 | 2020-03-09 00:10:00 | 0.33 | 10 |
| circuit_A | 50 | 50 | 2020-03-09 00:11:00 | 0.5 | 10 |
| circuit_A | 50 | 50 | 2020-03-09 00:12:00 | 0.5 | 7 |
| circuit_A | 50 | 50 | 2020-03-09 00:13:00 | 0.33 | 7 |
| circuit_A | 50 | 50 | 2020-03-09 00:14:00 | 0.17 | 5 |
| circuit_A | 50 | 50 | 2020-03-09 00:15:00 | 0.33 | 5 |
| circuit_A | 50 | 50 | 2020-03-09 00:16:00 | 0.33 | 5 |
| circuit_A | 50 | 50 | 2020-03-09 00:17:00 | 0.5 | 10 |
| circuit_A | 50 | 50 | 2020-03-09 00:18:00 | 1 | 10 |
| circuit_A | 50 | 50 | 2020-03-09 00:19:00 | 0.5 | 7 |

| circuit_name | down_bw_mbps | up_bw_mbps | tunnel_name | time | rtt | base_rtt | additional_latency |
|---|---|---|---|---|---|---|---|
| circuit_A | 100 | 100 | tunnel_1 | 2020-11-03 13:00:00 | 65.7 | 63 | 2.7 |
| circuit_A | 100 | 100 | tunnel_1 | 2020-11-03 13:01:00 | 64 | 63 | 1 |
| circuit_A | 100 | 100 | tunnel_1 | 2020-11-03 13:02:00 | 64 | 63 | 1 |
| circuit_A | 100 | 100 | tunnel_1 | 2020-11-03 13:03:00 | 64 | 63 | 1 |
| circuit_A | 100 | 100 | tunnel_1 | 2020-11-03 13:04:00 | 78 | 63 | 15 |
| circuit_A | 100 | 100 | tunnel_1 | 2020-11-03 13:05:00 | 64 | 63 | 1 |
| circuit_A | 100 | 100 | tunnel_1 | 2020-11-03 13:06:00 | 63.8 | 63 | 0.8 |
| circuit_A | 100 | 100 | tunnel_1 | 2020-11-03 13:07:00 | 63.8 | 63 | 0.8 |
| circuit_A | 100 | 100 | tunnel_1 | 2020-11-03 13:08:00 | 63.7 | 63 | 0.7 |
| circuit_A | 100 | 100 | tunnel_1 | 2020-11-03 13:09:00 | 63.7 | 63 | 0.7 |

| circuit_name | down_bw_mbps | up_bw_mbps | tunnel_name | time | rtt | base_rtt | additional_latency |
|---|---|---|---|---|---|---|---|
| circuit_A | 100 | 100 | tunnel_2 | 2020-11-03 13:00:00 | 122.0 | 107 | 15.0 |
| circuit_A | 100 | 100 | tunnel_2 | 2020-11-03 13:01:00 | 107 | 107 | 0 |
| circuit_A | 100 | 100 | tunnel_2 | 2020-11-03 13:02:00 | 107.3 | 107 | 0.3 |
| circuit_A | 100 | 100 | tunnel_2 | 2020-11-03 13:03:00 | 107.3 | 107 | 0.3 |
| circuit_A | 100 | 100 | tunnel_2 | 2020-11-03 13:04:00 | 122.3 | 107 | 15.3 |
| circuit_A | 100 | 100 | tunnel_2 | 2020-11-03 13:05:00 | 107 | 107 | 0 |
| circuit_A | 100 | 100 | tunnel_2 | 2020-11-03 13:06:00 | 107 | 107 | 0 |
| circuit_A | 100 | 100 | tunnel_2 | 2020-11-03 13:07:00 | 107 | 107 | 0 |
| circuit_A | 100 | 100 | tunnel_2 | 2020-11-03 13:08:00 | 107 | 107 | 0 |
| circuit_A | 100 | 100 | tunnel_2 | 2020-11-03 13:09:00 | 107.3 | 107 | 0.3 |

FIG. 7

| circuit_name | down_bw_mbps | up_bw_mbps | tunnel_name | time | rtt | base_rtt | additional_latency | circuit_utilization_pct |
|---|---|---|---|---|---|---|---|---|
| circuit_A | 100 | 100 | tunnel_1 | 2020-11-03 13:06:00 | 63.8 | 63 | 0.8 | 1 |
| circuit_A | 100 | 100 | tunnel_1 | 2020-11-03 13:08:00 | 63.7 | 63 | 0.7 | 1 |
| circuit_A | 100 | 100 | tunnel_1 | 2020-11-03 13:09:00 | 63.7 | 63 | 0.7 | 1 |
| circuit_A | 100 | 100 | tunnel_2 | 2020-11-03 13:06:00 | 107 | 107 | 0 | 1 |
| circuit_A | 100 | 100 | tunnel_2 | 2020-11-03 13:08:00 | 107 | 107 | 0 | 1 |
| circuit_A | 100 | 100 | tunnel_2 | 2020-11-03 13:09:00 | 107.3 | 107 | 0.3 | 1 |
| circuit_A | 100 | 100 | tunnel_1 | 2020-11-03 13:05:00 | 64 | 63 | 1 | 2 |
| circuit_A | 100 | 100 | tunnel_1 | 2020-11-03 13:07:00 | 63.8 | 63 | 0.8 | 2 |
| circuit_A | 100 | 100 | tunnel_2 | 2020-11-03 13:05:00 | 107 | 107 | 0 | 2 |
| circuit_A | 100 | 100 | tunnel_2 | 2020-11-03 13:07:00 | 107 | 107 | 0 | 2 |
| circuit_A | 100 | 100 | tunnel_1 | 2020-11-03 13:02:00 | 64 | 63 | 1 | 4 |
| circuit_A | 100 | 100 | tunnel_1 | 2020-11-03 13:03:00 | 64 | 63 | 1 | 4 |
| circuit_A | 100 | 100 | tunnel_2 | 2020-11-03 13:02:00 | 107.3 | 107 | 0.3 | 4 |
| circuit_A | 100 | 100 | tunnel_2 | 2020-11-03 13:03:00 | 107.3 | 107 | 0.3 | 4 |
| circuit_A | 100 | 100 | tunnel_1 | 2020-11-03 13:00:00 | 65.7 | 63 | 2.7 | 12 |
| circuit_A | 100 | 100 | tunnel_1 | 2020-11-03 13:01:00 | 64 | 63 | 1 | 12 |
| circuit_A | 100 | 100 | tunnel_1 | 2020-11-03 13:04:00 | 78 | 63 | 15 | 12 |
| circuit_A | 100 | 100 | tunnel_2 | 2020-11-03 13:00:00 | 122.8 | 107 | 15.8 | 12 |
| circuit_A | 100 | 100 | tunnel_2 | 2020-11-03 13:01:00 | 107 | 107 | 0 | 12 |
| circuit_A | 100 | 100 | tunnel_2 | 2020-11-03 13:04:00 | 122.3 | 107 | 15.3 | 12 |

| circuit_name | down_bw | up_bw | util_percent | mean | median | pctl_40 | pctl_50 | pctl_60 | pctl_70 | pctl_80 | pctl_90 | pctl_95 | sample_count | expected_delay |
|---|---|---|---|---|---|---|---|---|---|---|---|---|---|---|
| circuit_A | 98 | 98 | 0 | | | | | | | | | | 292 | 0 |
| circuit_A | 98 | 98 | 1 | 0.2 | 0.1 | 0.1 | 0.1 | 0.1 | 0.2 | 0.3 | 0.4 | 0.5 | 21466 | 0.11 |
| circuit_A | 98 | 98 | 2 | 0.3 | 0.1 | 0.1 | 0.1 | 0.2 | 0.2 | 0.3 | 0.4 | 0.6 | 19270 | 0.23 |
| circuit_A | 98 | 98 | 3 | 0.3 | 0.1 | 0.1 | 0.1 | 0.2 | 0.2 | 0.3 | 0.4 | 0.7 | 18248 | 0.34 |
| circuit_A | 98 | 98 | 4 | 0.4 | 0.1 | 0.1 | 0.1 | 0.2 | 0.2 | 0.3 | 0.6 | 2 | 7492 | 0.46 |
| circuit_A | 98 | 98 | 5 | 0.7 | 0.1 | 0.1 | 0.1 | 0.2 | 0.3 | 0.4 | 1.1 | 3.9 | 4784 | 0.57 |
| circuit_A | 98 | 98 | 6 | 0.9 | 0.2 | 0.1 | 0.2 | 0.2 | 0.3 | 0.4 | 1.9 | 5.9 | 3720 | 0.68 |
| circuit_A | 98 | 98 | 7 | 1.1 | 0.2 | 0.1 | 0.2 | 0.2 | 0.3 | 0.6 | 3 | 7.7 | 3728 | 0.8 |
| circuit_A | 98 | 98 | 8 | 1.1 | 0.2 | 0.1 | 0.2 | 0.2 | 0.3 | 0.6 | 2.6 | 6.7 | 3500 | 0.91 |
| circuit_A | 98 | 98 | 9 | 1.3 | 0.2 | 0.1 | 0.2 | 0.3 | 0.4 | 0.9 | 3.3 | 7.7 | 3464 | 1.03 |
| circuit_A | 98 | 98 | 10 | 1.4 | 0.2 | 0.1 | 0.2 | 0.3 | 0.5 | 1.1 | 4 | 8 | 8300 | 1.14 |
| circuit_A | 98 | 98 | 12 | 1.8 | 0.2 | 0.2 | 0.2 | 0.4 | 0.6 | 1.7 | 4.8 | 8.6 | 5580 | 1.37 |
| circuit_A | 98 | 98 | 14 | 2 | 0.3 | 0.2 | 0.3 | 0.4 | 0.8 | 2.2 | 6.4 | 9.7 | 5183 | 1.6 |
| circuit_A | 98 | 98 | 16 | 2.3 | 0.3 | 0.2 | 0.3 | 0.5 | 1.1 | 2.6 | 7 | 10.5 | 3712 | 1.82 |
| circuit_A | 98 | 98 | 18 | 2.7 | 0.3 | 0.2 | 0.3 | 0.6 | 1.5 | 3.8 | 9 | 13.1 | 3032 | 2.05 |
| circuit_A | 98 | 98 | 20 | 3.4 | 0.5 | 0.3 | 0.5 | 1.2 | 2.4 | 4.8 | 10 | 14.3 | 4272 | 2.28 |
| circuit_A | 98 | 98 | 25 | 4.5 | 1.1 | 0.5 | 1.1 | 2.3 | 4.5 | 7.6 | 12.3 | 19.8 | 1832 | 2.85 |
| circuit_A | 98 | 98 | 30 | 6.2 | 2.3 | 0.8 | 20.3 | 4.3 | 6.6 | 10.2 | 17.8 | 24.4 | 856 | 3.42 |
| circuit_A | 98 | 98 | 35 | 9.2 | 3 | 1.1 | 3 | 6.7 | 10.4 | 14 | 22.5 | 34.5 | 336 | 3.99 |
| circuit_A | 98 | 98 | 40 | 8 | 2.1 | 1 | 2.1 | 4.4 | 7 | 10.2 | 18.7 | 30.2 | 212 | 4.56 |
| circuit_A | 98 | 98 | 45 | 7.5 | 1.5 | 0.7 | 1.5 | 3.7 | 8.5 | 11.7 | 24.7 | 36.7 | 148 | 5.13 |
| circuit_A | 98 | 98 | 50 | 7.2 | 3.5 | 1.6 | 3.5 | 5.5 | 7.9 | 11.1 | 23.3 | 33.9 | 208 | 5.7 |
| circuit_A | 98 | 98 | 60 | 12.9 | 4.8 | 3.7 | 4.8 | 7.7 | 9.9 | 17.9 | 27.9 | 43.3 | 92 | 6.84 |
| circuit_A | 98 | 98 | 70 | 19.6 | 13.6 | 10.5 | 13.6 | 18.2 | 30.6 | 34.9 | 48.7 | 52.4 | 96 | 7.98 |
| circuit_A | 98 | 98 | 80 | 21 | 13.5 | 8.2 | 13.5 | 15.9 | 20.6 | 25.7 | 53.6 | 100 | 120 | 9.12 |
| circuit_A | 98 | 98 | 90 | 25.5 | 19.6 | 14.4 | 19.6 | 24.8 | 31.2 | 37.9 | 57.5 | 100 | 332 | 10.26 |

NETWORK PATH HEALTH SCORING BASED ON LOAD BINNED LATENCY DATA

BACKGROUND

The disclosure generally relates to electronic communication techniques (e.g., CPC class H04) and arrangements for maintenance of administration of packet switching networks (e.g., CPC subclass H04L 41/00).

The terms wide area network (WAN) and local area network (LAN) identify communications networks of different geographic scope. For a LAN, the geographic area can range from a residence or office to a university campus. For a WAN, the geographic area can be defined with respect to a LAN—greater than the area of a LAN. In the context of telecommunications, a circuit refers to a discrete path that carries a signal through a network between two remote locations. A circuit through a WAN can be a physical circuit or a virtual/logical circuit. A physical WAN circuit refers to a fixed, physical path through a network. A dedicated or leased line arrangement uses a physical WAN circuit. A logical WAN circuit refers to a path between endpoints that appears fixed but is one of multiple paths through the WAN that can be arranged. A logical circuit is typically implemented according to a datalink and/or network layer protocol, although a transport layer protocol (e.g., transmission control protocol (TCP)) can support a logical circuit.

The Software-defined Network (SDN) paradigm decouples a network management control plane from the data plane. A SDN controller that implements the control plane imposes rules on switches and routers (physical or virtual) that handle Internet Protocol (IP) packet forwarding in the data plane. The limitations of managing traffic traversing a WAN invited application of the SDN paradigm in WANs.

BRIEF DESCRIPTION OF THE DRAWINGS

Embodiments of the disclosure may be better understood by referencing the accompanying drawings.

FIG. 4 depicts a subset of packet loss data correlated with circuit utilization percentages by time.

FIG. 5 depicts a circuit profile built from example packet loss data based on the packet loss data depicted in FIG. 4.

FIG. 7 depicts a subset of latency data delineated by tunnel with corresponding latency offset (or additional latency) calculated for each observation.

FIG. 8 depicts a subset of latency data with additional latencies grouped by circuit utilization bins based on timestamps of samples.

FIG. 9 depicts a circuit profile built from example latency data based on the latency data depicted in FIG. 8.

DESCRIPTION

The description that follows includes example systems, methods, techniques, and program flows that embody aspects of the disclosure. However, it is understood that this disclosure may be practiced without these specific details. For instance, this disclosure refers to packet loss data and latency in terms of round trip time in illustrative examples. Aspects of this disclosure can use other metrics for scoring, such as jitter and one-way latency. In addition, multiple examples refer to scoring circuits. However, embodiments can score a network path that does not include a network circuit, multiple network paths provisioned on a circuit, etc. In other instances, well-known instruction instances, protocols, structures and techniques have not been shown in detail in order not to obfuscate the description.

Overview

A network path scoring system is disclosed herein that scores quality of network paths (e.g., SD-WAN circuits) to facilitate identification of poorly performing network paths or circuits for investigation. The scoring system builds a profile of a metric that corresponds to quality of network communications (e.g., latency or packet loss) in relation to a network circuit bandwidth/capacity utilization ("circuit utilization"). The profile indicates the percentiles of the quality metric at each bucket or bin of circuit utilization based on time-series quality metric data. Using the quality metric profile for the circuit, the scoring system calculates a capacity agnostic score. This circuit scoring facilitates identification of problematic circuits for investigation and allows for a refined presentation of network state and informs diagnosis of network state.

The scoring system scores circuits based on time-series data collected from nodes of a SD-WAN instance, for example edge devices. The scoring relates circuit utilization to a network communication quality metric. The scoring system can generate scores for each quality metric. Assuming availability of data for quality metrics for latency and packet loss, the scoring system can score circuit and/or network path health based on historical packet loss and historical offset from a base latency ("observed additional latency") with respect to expected additional latency. This scoring can be used to identify systemic and persistent problems in a network.

Example Illustrations

Figure 1:
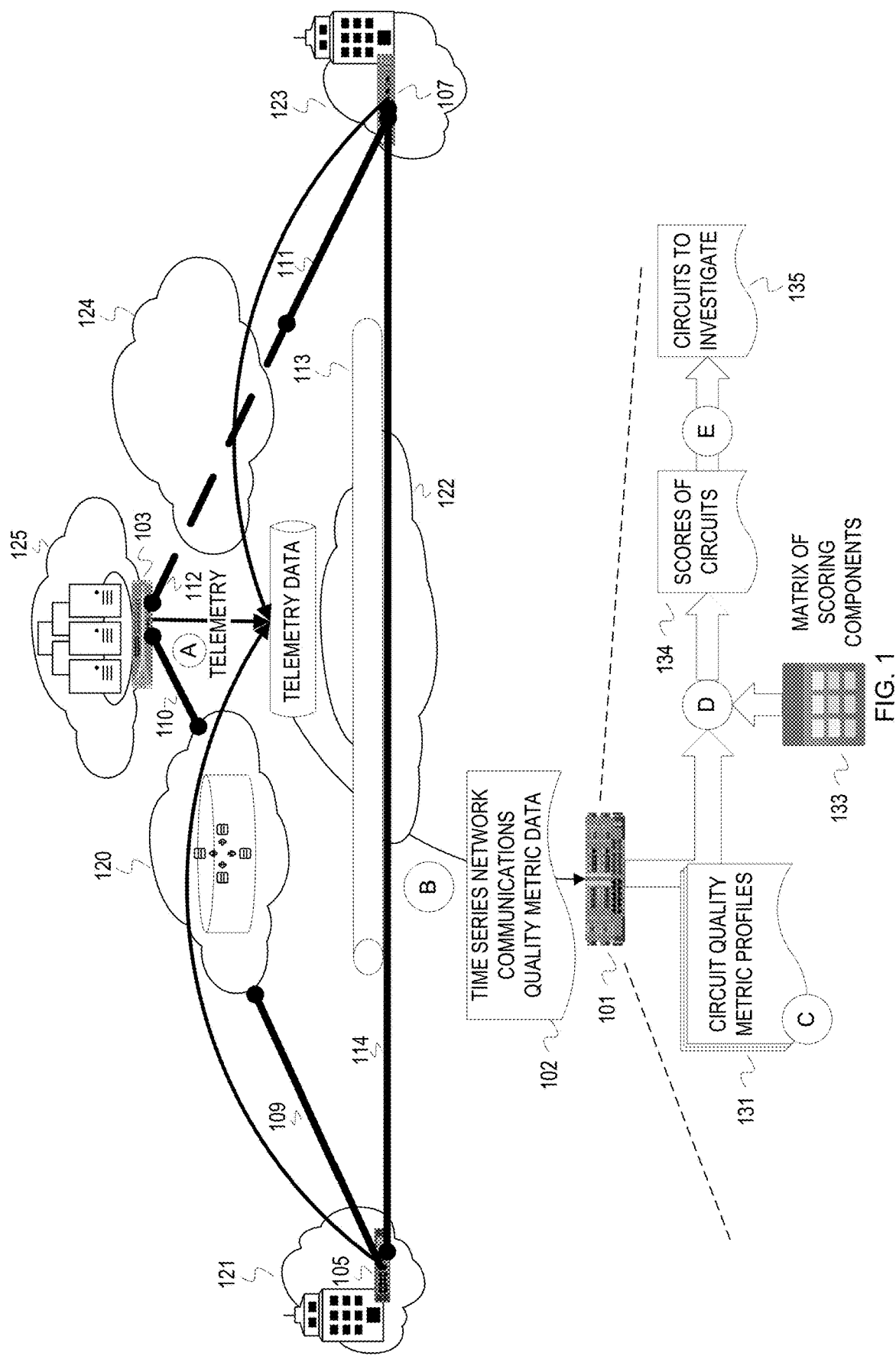
FIG. 1 is a diagram of an example circuit scoring system to identify circuits of a network for investigation.

FIG. 1 is a diagram of an example circuit scoring system to identify circuits of a network for investigation. A network path may traverse circuits between customer edge devices at different sites and provider edge devices and a multi-protocol label switching underlay of a provider(s) or even different underlays of different providers. A network path may be a tunnel provisioned between the endpoints. A network path may be a point-to-point or point-to-multi-point circuit between sites. Moreover, the route of a network path can change. Regardless of the particular nodes and infrastructure being traversed, the communication quality of the network path is measured based on probes transmitted between the endpoints which define the path. Bandwidth utilization is determined with respect to bandwidth capacity as defined at the endpoint devices. Despite the myriad incarnations of a network path, the bandwidth capacity is typically indicated as a setting/configuration of a circuit corresponding to a network path(s). Due to the multitude of connection options, layouts/configurations (e.g., overlay, underlay, etc.), and technologies in network communications, this example illustration illustrates a single, relatively simple scenario that includes three customer edge devices 103, 105, 107. The edge device 103 is at a data center hosted on a network 125, which may be an on-premise or an off-premise data center. The edge device 105 is at a branch office network 121 and the edge device 107 is at a branch office network 123. The edge device 105 is communicatively coupled with the edge device 103 via a network path that traverses a network 120 that provides a multi-protocol label switching service. The edge device 105 connects to the network 120 via a circuit 109 and the edge device 103 connects to the network 120 via a circuit 110. The edge device 105 is communicatively coupled with the edge device 107 via a network path 113 (illustrated as a tunnel) provisioned on a circuit 114 which traverses a private WAN 122. The edge device 103 is communicatively coupled with the edge device 107 via a network path which traverses a public WAN 124 along a direct internet connection 112. The edge device 107 connects to the public WAN 124 via a circuit 111. The network paths form part of an overlay (e.g., a secure network fabric or virtual private network (VPN)) that securely interconnects geographically disparate sites/networks of an organization.

FIG. 1 is annotated with a series of letters A-E which represent operational stages of the scoring system. Although these stages are ordered for this example, the stages illustrate one example to aid in understanding this disclosure and should not be used to limit the claims. Subject matter falling within the scope of the claims can vary with respect to the order and some of the operations. In addition, each stage can involve one operation or multiple operations.

At stage A, the system collects telemetry data that can be used for scoring the circuits. In this example illustration, the edge devices 103, 105, 107 communicate the telemetry data for storage in a repository 117 (e.g., a data lake, blob, database, etc.). The repository 117 may be maintained at a data center of a cybersecurity provider or in a third-party cloud provided to the security provider, for example. This telemetry involves the edge devices 103, 105, 107 or another system(s) in communication with the edge devices sending probes per network path of a circuit at a time interval smaller than a time interval that will be used to assess the circuits (e.g., sending probes at sub-second time intervals for minute granularity assessment). The telemetry data include data indicating quality of the network communications (e.g., packet loss, latency or round trip time (rtt), jitter, etc.) in the WAN that includes the circuits 109, 110, 111, 114.

At stage B, an appliance 101 (e.g., software and/or hardware form factor) that monitors and/or manages the WAN encompassing the circuits 109, 110, 111, 114 queries the repository 117. The appliance 101 queries the repository 117 for time-series network communication quality metric data (e.g., packet loss, latency) for a set of selected/identified circuits and/or corresponding network paths (e.g., tunnels). The appliance 101 queries for a time window of data sufficient to score each of the circuits, for example a 3 week time window. The appliance 101 receives time-series network communications quality metric data 102.

At stage C, the appliance 101 builds circuit quality metric profiles for each circuit indicated in the time-series network communications quality metric data 102. To build a circuit quality metric profile, the appliance 101 bins the data of each circuit by a circuit utilization percentage bin (e.g., 27 bins with decreasing resolution/increasing sub-ranges corresponding to percentage of circuit utilization from 0-100%). The appliance 101 determines circuit utilization based on the circuit capacity, which is defined/configured, and the retrieved data. Use of circuit utilization percentage allows for scoring to be agnostic with respect to circuit bandwidth/capacity. A time granularity for determining circuit utilization can be predefined or configured. For instance, the appliance 101 can determine average packet loss in each 1 minute interval within the obtained time-series data 102, assuming multiple observations per 1 minute interval. Accordingly, circuit utilization would also be determined for the 1 minute interval.

At stage D, the appliance 101 uses each of the circuit quality metric profiles 131 to calculate a score. Scoring varies depending upon the communication quality metric. For instance, scoring based on latency uses the statistical information in the circuit profile while scoring based on packet loss uses a matrix of scoring components. The appliance 101 selects from a matrix of scoring components 133 to score a circuit. Expert/domain knowledge is used to create the matrix of scoring components 133. A scoring component is chosen for each quality metric percentile for each circuit utilization bin. At greater load/higher utilization, scoring components indicating higher circuit quality (e.g., increasing value corresponds to increasing quality) will occur across a wider range of quality metric percentiles based on an expectation that circuit quality decreases at greater load. At lower circuit utilization, higher circuit quality scoring components will be set for a smaller range of percentiles based on an expectation that high circuit quality can be maintained at lower loads. Quantifying expectations of network communications quality at different loads can use negative scoring components to emphasize performance or network communications quality of a circuit falling substantially below expectations. Each of the circuit profiles 131 has same dimensions as the matrix 133. For each circuit, the appliance 101 determines, for each circuit utilization bin in the circuit profile, the percentile at which the best observation of the quality metric occurs. Assuming a 2-dimensional data arrangement, for example a 2-dimensional (2D) data structure such as a 2D array, and a network communications quality metric that is considered better with lower values, the best observations across the circuit utilization bins form a non-zero boundary. The appliance 101 selects scoring components from the matrix 133 at locations corresponding to the non-zero boundary in the circuit profile. An example circuit profile is presented later in FIG. 5. To aggregate the scoring components into a circuit score, the appliance 101 computes the score as an average of the selected scoring components. Scoring can vary depending upon availability of network communications quality metrics. If data is available for multiple network communications quality metrics, then a scoring system can use multiple of the scores (e.g., aggregate the scores across different network communications quality metrics) or select one of the network communications quality metrics as representative of circuit quality (e.g., selecting the network communications quality metric with the lowest score).

At stage E, the appliance 101 generates a list 135 of circuits to investigate based on the circuit scoring. A network administrator has likely configured a threshold score for identifying a circuit as poor quality. The appliance 101 identifies which, if any, of the previously selected circuits have a score that falls below the defined circuit score threshold. The appliance 101 generates the listing of circuit identifiers to facilitate investigation of the circuits identified as having low scores or poor quality scores to determine a cause.

Figure 2:
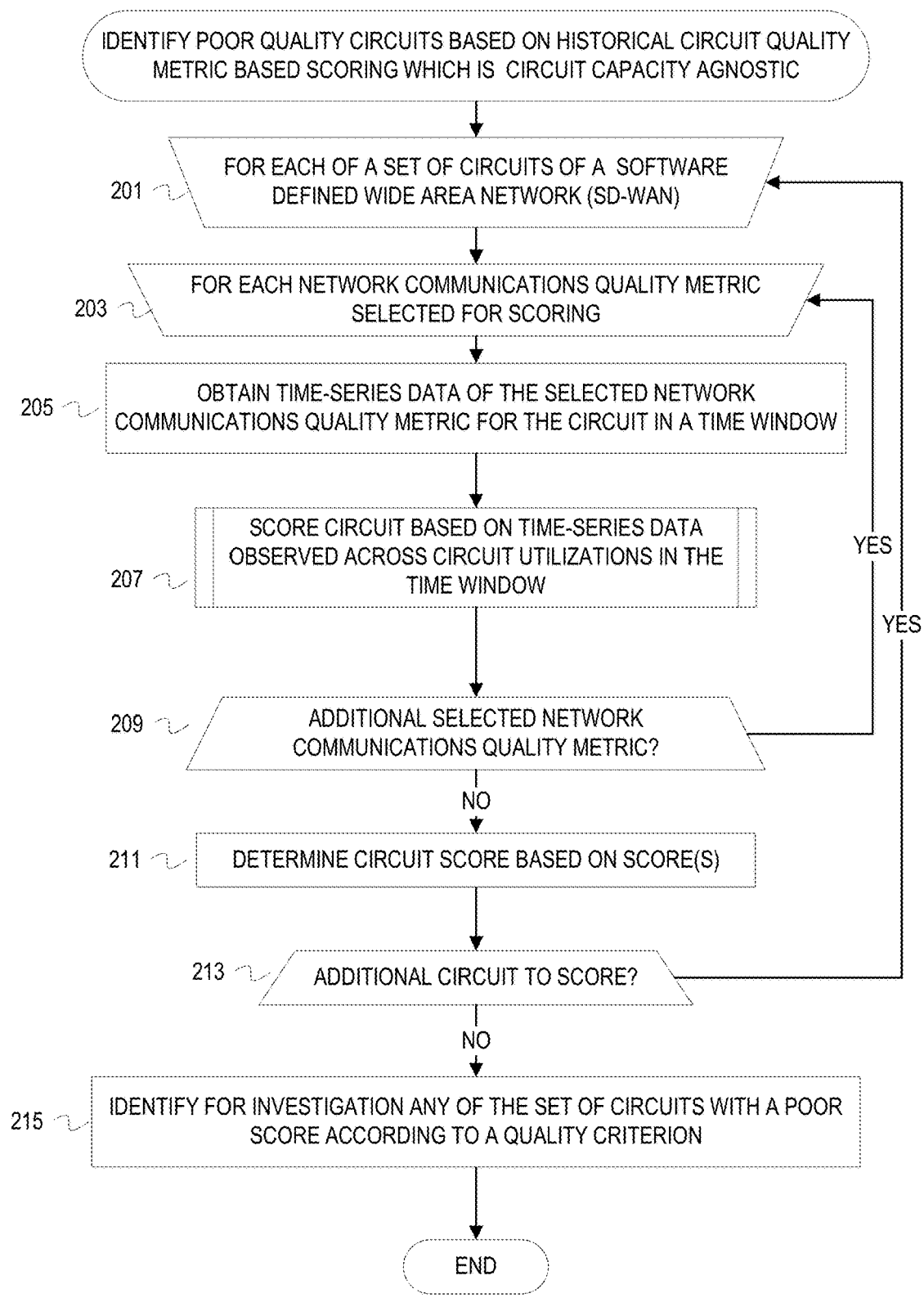
FIG. 2 is a flowchart of example operations for identifying poor quality circuits based on time-series network communications quality metric based scoring which is circuit capacity agnostic.

FIG. 2 is a flowchart of example operations for identifying poor quality circuits based on time-series network communications quality metric based scoring which is circuit capacity agnostic. The example operations of all of the flowcharts herein are described with reference to a scoring system for consistency with the FIG. 1. The name chosen for the system is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 201, a scoring system begins processing data for each of a set of circuits of a SD-WAN. The scoring system may score all circuits of a network or score selected circuits of a network. For instance, the scoring system may score circuits of a network according to a defined schedule and score a subset of the circuits (e.g., circuits corresponding to paths in a problematic geographical region or in a region enduring a prolonged weather event) at a higher frequency or on-demand.

At block 203, the scoring system begins processing data for each network communications quality metric selected for scoring the selected circuit. Telemetry data can include data of different network communication quality metrics. One or more of these metrics can be selected as a basis for circuit scoring. For instance, the scoring system may score based on packet loss data and then based on latency. For each network communications quality metric, the scoring system performs operations represented by blocks 205, 207 for the circuit currently being scored.

At block 205, the scoring system obtains time-series data for the selected circuit for the selected quality metric. The scoring system obtains the time-series data according to a specified time window. For instance, the scoring system can query a database with parameters including a circuit identifier, a quality metric identifier, and a time range (e.g., 1 month prior to today).

Figure 3:
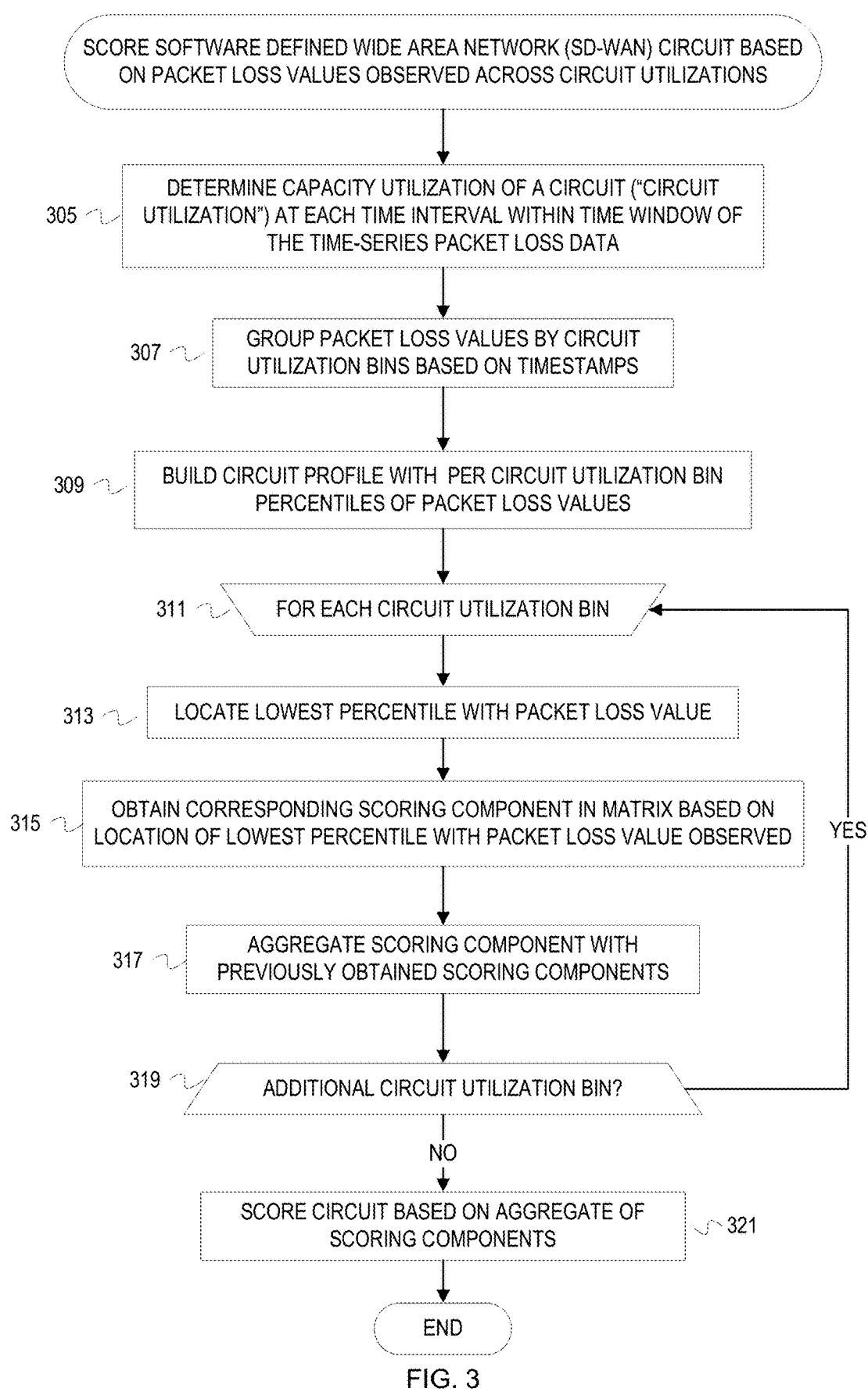
FIG. 3 is a flowchart of example operations for scoring a SD-WAN circuit based on packet loss observations/values observed across circuit utilizations.
Figure 6:
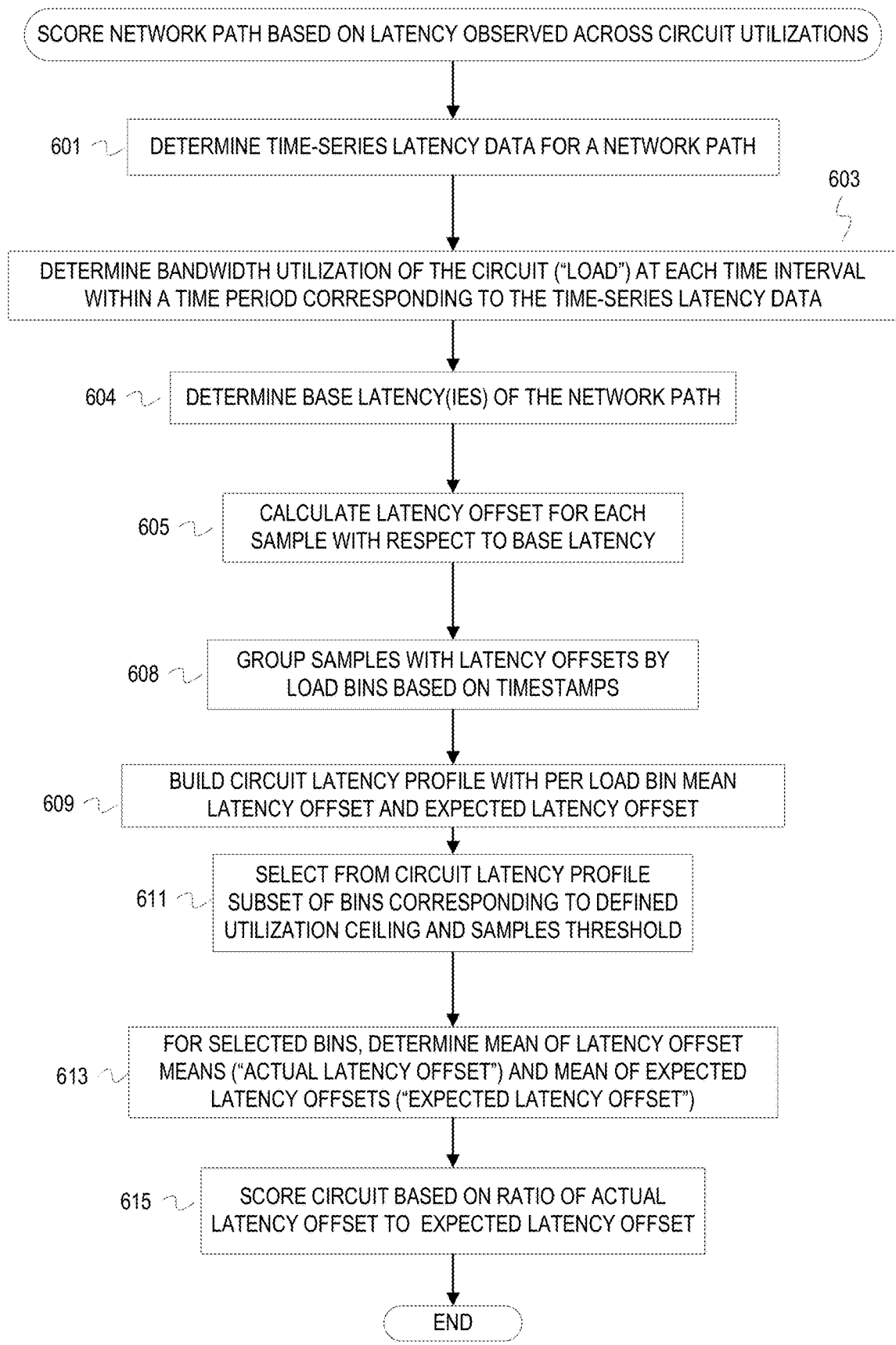
FIG. 6 is a flowchart of example operations for scoring a SD-WAN circuit based on latency observations/values observed across circuit utilizations.

At block 207, the scoring system scores the selected circuit based on the time-series quality metric observations or values across circuit utilizations. The scoring can vary with the network communications quality metric. FIGS. 3 and 6 provide examples for packet loss and latency, respectively.

At block 209, the scoring system determines whether there is an additional metric selected for scoring the currently selected circuit. If there is an additional metric selected for scoring, operational flow returns to block 203 to begin processing data of the next metric for the currently selected circuit. Otherwise, operational flow proceeds to block 211.

At block 211, the scoring system determines a circuit score based on each score(s). If a single quality metric was selected for scoring, the already calculated score can be used to score the circuit. If multiple quality metrics were selected for scoring the circuit, then the scoring system can select a representative one of the metric scores (e.g., select a score that is neither the highest nor the lowest, select the lowest score, etc.) or aggregate the scores (e.g., calculate a mean or median). The scoring system can present the different options as configurations to be selected.

At block 213, the scoring system determines whether there is an additional circuit to score. If there is an additional circuit to score, operational flow returns to block 201 for the scoring system to select a next circuit to score. Otherwise, operational flow proceeds to block 215.

At block 215, the scoring system identifies for investigation any of the set of circuits with a poor score according to a quality criterion. A quality criterion can be defined that identifies a poor scoring circuit. The quality criterion, for example, can specify that a circuit score below 70 be identified as having a poor score or of poor quality necessitating investigation. Embodiments may set quality criteria with multiple score thresholds to give different priorities of investigation. For example, a circuit scoring below a severely poor threshold (e.g., score <30) can be prioritized as urgent for investigation while a circuit scoring within an underperforming range (e.g., 30<=score<70) is flagged for investigation but with a lower priority. Circuits are not necessarily scored in sequence or individually. A scoring system can score circuits in parallel.

The example operations of FIG. 2 provide a scoring paradigm generalized with respect to network communications quality metrics. FIGS. 3 and 6 provide example operations for two illustrative network communications quality metrics: packet loss and latency.

FIG. 3 is a flowchart of example operations for scoring a SD-WAN circuit based on packet loss observations/values observed across circuit utilizations. The description of FIG. 3 presumes that program code corresponding to the example operations is being invoked after obtaining time-series packet loss data (e.g., as represented in 205 of FIG. 2). The operations of FIG. 3 can be considered as corresponding to 207 of FIG. 2 with the time-series data being time-series packet loss data.

At block 305, the scoring system determines capacity utilization of a circuit at each time interval within a time window of time-series packet loss data of the circuit. To calculate capacity utilization, the scoring system accesses or obtains time-series data in a same time window (e.g., matching time-stamps) as the time window of the packet loss data. The scoring system determines the amount of data transmitted (for an egress circuit) or received (for an ingress circuit) in each time interval (e.g., each minute) and calculates the capacity according to a capacity metric (e.g., megabits/second (mbps)). To facilitate capacity agnostic scoring, the scoring system determines capacity of the circuit (as configured) and then calculates circuit utilization as a percentage of the circuit capacity. Using the percentage of capacity utilization allows the scoring to be comparable across circuits having different capacities, referred to herein as being "capacity agnostic." The packet loss data is binned according to percent circuit utilization bins.

At block 307, the scoring system groups packet loss values by circuit utilization bins based on timestamps. The scoring system correlates packet loss values with circuit utilization bins by matching or approximately matching timestamps. Packet loss for each circuit utilization time interval is determined based on the time-series packet loss data. After determining the packet loss value for a time interval, the timestamps are used to correlate the packet loss value with the circuit utilization percentage determined for that same time interval. FIG. 4 provides an example to aid in understanding this correlation.

FIG. 4 depicts a subset of packet loss data correlated with circuit utilization percentages by time. Packet loss data 401 is depicted in a tabular format with several rows of samples and 6 columns. The columns from left to right are labeled circuit_name, down_bw_mbps, up_bw_mbps, time, ingress_pkt_loss_pct, and circuit_utilization_pct. The column circuit_name includes an identifier of a circuit, which in this example is circuit_A. The columns down_bw_mbps and up_bw_mbps respectively include download bandwidth capacity and upload bandwidth capacity of the identified circuit. The column time includes a series of 1 minute time intervals within a time window of the time-series packet loss data. The column ingress_pkt_loss_pct includes percentage of ingress packet loss at each time interval. The column circuit_utilization_pct includes percentage of circuit utilization at each time interval indicated in the time column. According to the first row, an ingress packet loss percentage of 0.17 and circuit utilization of 7% was observed for circuit_A at a time interval beginning at "2020-03-09 00:00:00" and ending at "2020-03-09 00:00:59." Across the rows, the packet loss data 401 indicates ingress packet loss percentages for circuit_A of 0, 0.17, 0.33, and 0.5 while circuit utilization was at 7%. The packet loss data 401 also indicates ingress packet loss percentages observed at circuit utilizations of 5% and 10%. For the time intervals with 5% circuit utilization, packet loss percentages of 0.17% and 0.33% were observed. For the time intervals with 10% circuit utilization, packet loss percentages of 0.33%, 0.5%, 0.67%, and 1% were observed. The observations are grouped into the corresponding circuit utilization bins.

Returning to FIG. 3, the scoring system builds a circuit profile for the circuit. The scoring system builds the circuit profile with per circuit utilization bin percentiles of packet loss values. The scoring system determines the percentiles of packet loss percentages for each circuit utilization percentage bin. An example circuit profile is depicted in FIG. 5.

Figure 5:
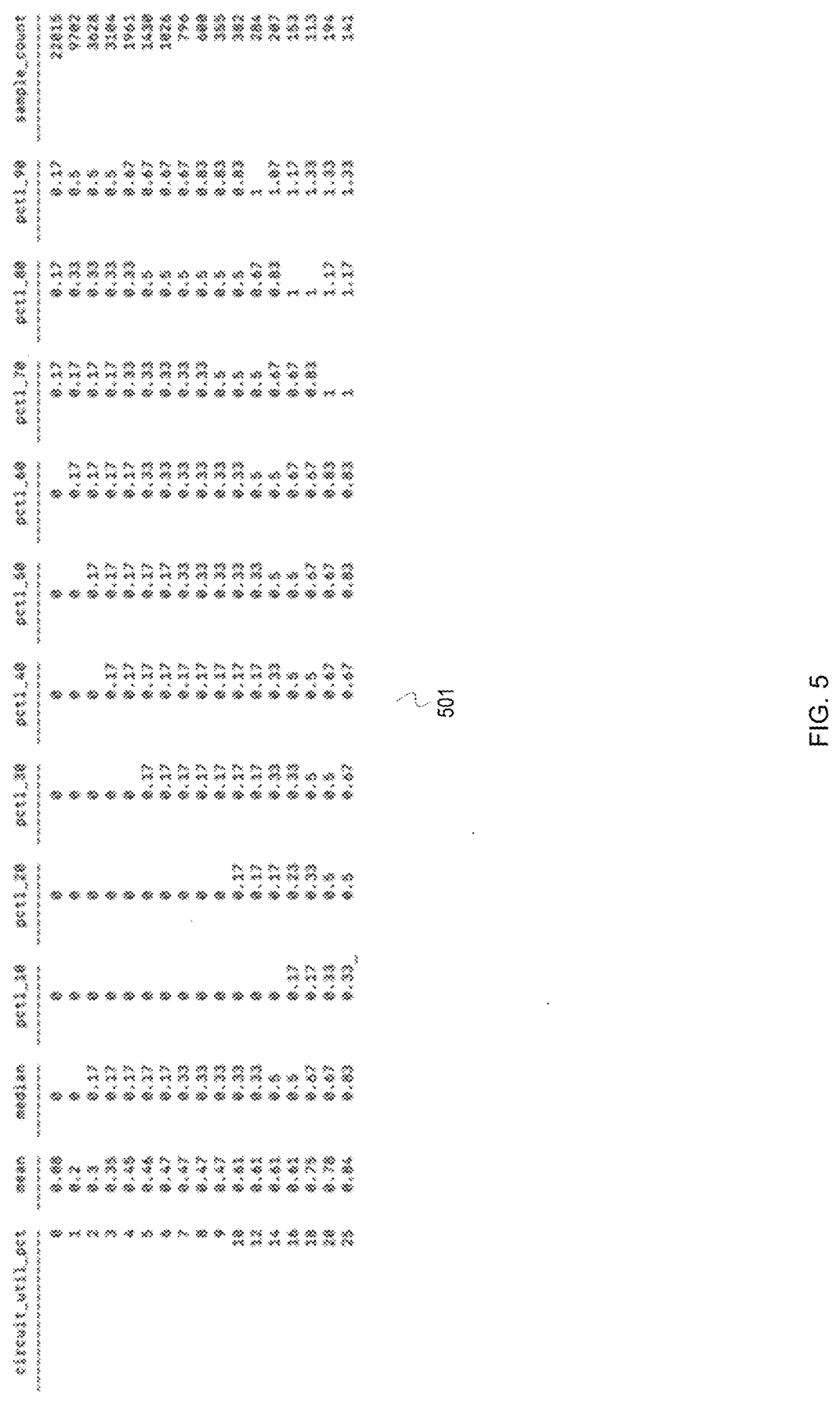

FIG. 5 depicts a circuit profile built from example packet loss data based on the packet loss data depicted in FIG. 4. A circuit profile 501 is depicted in a tabular format with a row for each circuit utilization percentage bin. The bins have been designed for each 1% increment from 0% to 10%, then 12%, 14%, 16%, 18%, 20%, and 25%. A profile can be built with different granularities of circuit utilization bins. The resolution of the bins decreases (or sub-ranges of the bins increases) for higher bandwidth utilization. This design choice is made since magnitude of relative packet loss variation at lower loads (e.g., 5% compared to 10% load) is substantially larger than the magnitude of relative packet loss variation at higher loads (e.g., 70% compared to 75% load). Higher granularity likely facilitates scoring that more accurately represents circuit quality. The columns of the circuit profile 501 include mean, median, and percentiles from 10 to 90 with increments of 10. For the 25% circuit utilization bin, ingress packet loss of 0.33% is observed at the $10^{th}$ percentile. In the same circuit utilization bin at the $90^{th}$ percentile, 1.33% ingress packet loss was observed. Since typical percentile ranking is being used (i.e., higher values at higher percentiles), the lower packet loss percentages occur at lower percentiles (i.e., better network communication quality in terms of packet loss is at the lower percentiles of the packet loss percentages distribution). At the lowest circuit utilization bin of 0% (which encompasses circuit utilization below 1%), the correlated observations are 0.17% at the $70^{th}$, $80^{th}$, and $90^{th}$ percentiles. Lower packet loss is expected at lighter loads. The occurrences of non-zero observations at the lowest percentiles coincide with the lowest packet loss observations at each circuit utilization bin. This non-zero boundary guides the circuit scoring. In the circuit profile 501, the non-zero boundary is formed with the following ingress packet loss percentages shown in Table 1.

TABLE 1

Non-Zero Boundary in Circuit Profile for Circuit Scoring

| Circuit Utilization Bin | Percentile |
|---|---|
| 0 | 70 |
| 1 | 60 |
| 2 | 50 |
| 3 | 40 |
| 4 | 40 |
| 5 | 30 |
| 6 | 30 |
| 7 | 30 |
| 8 | 30 |
| 9 | 30 |
| 10 | 20 |
| 12 | 20 |
| 14 | 20 |
| 16 | 10 |
| 18 | 10 |
| 20 | 10 |
| 25 | 10 |

Returning to FIG. 3, the scoring system begins iterating over the locations forming the non-zero boundary to score the circuit. At block 311, the scoring system begins processing each circuit utilization bin in the circuit profile. The example processing operations are depicted in blocks 313, 315, and 317.

At block 313, the scoring system locates the lowest percentile with a packet loss value. The scoring system begins at the lowest percentile entry (e.g., $10^{th}$ percentile) of the currently selected circuit utilization bin and searches until finding an entry with a non-zero value. Based on the example depicted in FIG. 5 and assuming the circuit profile is accessed with index values that begin at 0, the scoring system would find the non-zero packet loss values for the circuit utilization bins 0%, 1%, and 2% at locations [0, 6], [1, 5], and [2, 4], respectively. The preference or expectation is that packet loss at low loads occurs less frequently and at a very low magnitude and the packet loss increases in frequency and magnitude as load increases.

At block 315, the scoring system obtains or looks up a corresponding scoring component in a scoring component matrix based on the location of the lowest percentile with a non-zero packet loss value. Referring again to the above 3 example locations forming part of the non-zero boundary in the circuit profile 501, the scoring system would access scoring components in the matrix with indexes [0, 6], [1, 5], and [2, 4] for the first few scoring components. The dimensions of the data structure implementing the scoring component matrix are defined by the resolution of the circuit utilization bins and the percentiles. Embodiments can adjust if resolution of the scoring component matrix and the circuit profile do not align. For instance, a scoring system can average scoring components if the matrix has a higher resolution of percentiles than a circuit profile.

Figure 11:
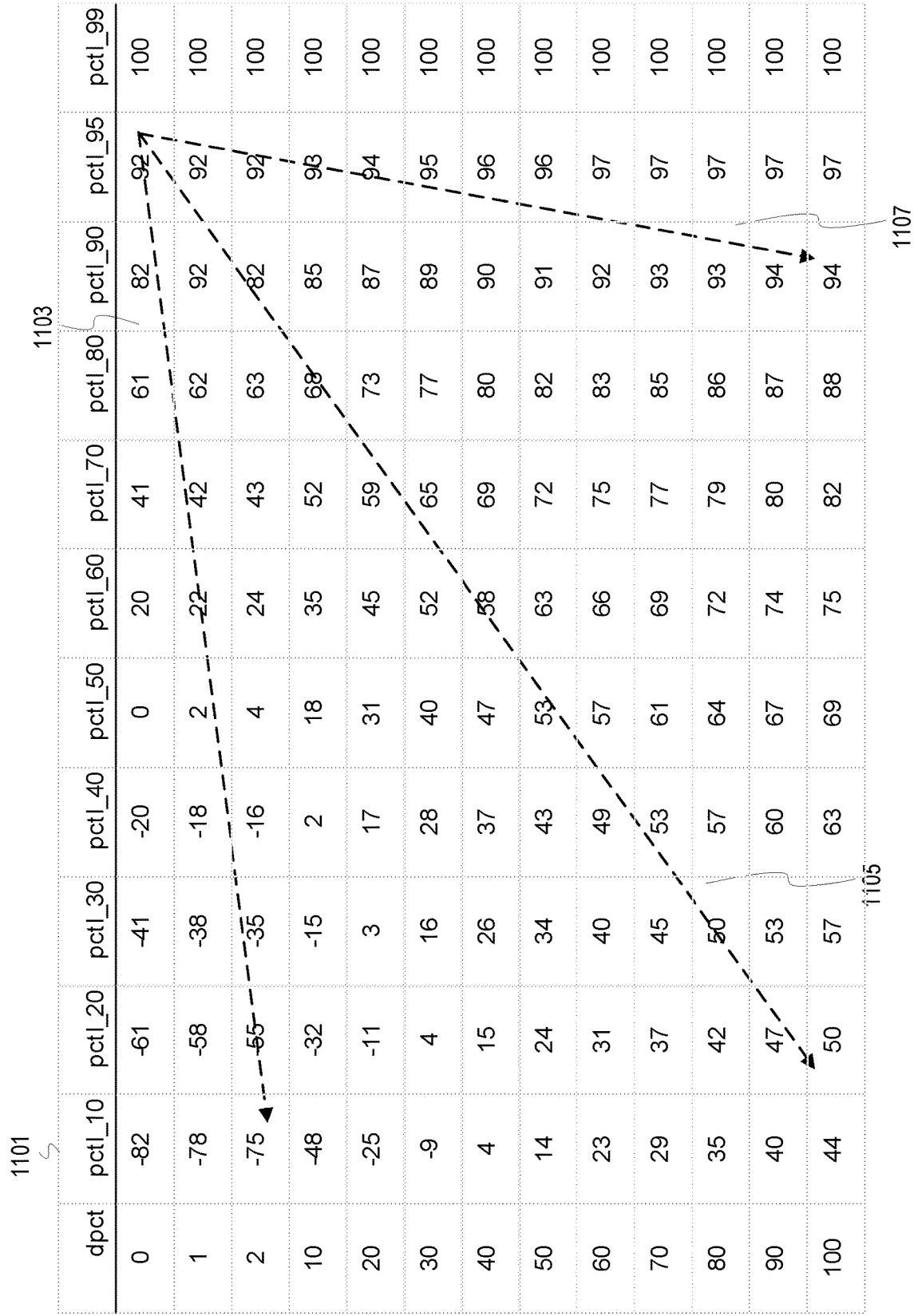
FIG. 11 is an example scoring component matrix for packet loss based network path scoring.

FIG. 11 is an example scoring component matrix for packet loss based network path scoring. A scoring component matrix 1101 includes example scoring components set for each combination of packet loss percentile and circuit utilization/load bin. FIG. 11 depicts the scoring component matrix 1101 with only a subset of the load bins due to space constraints. These example scoring components include negative weights or scoring components at the lower percentiles (e.g., <$50^{th}$ percentile) for load bins corresponding to low load (e.g., <30% load). FIG. 11 overlays 3 lines 1103, 1105, 1107 over the scoring component matrix 1101. Each of the lines 1103, 1105, 1107 represents a potential boundary line with a qualifying descriptor. The line 1103 represents a boundary line that would yield a packet loss based score that would be interpreted as very bad quality/health. The line 1105 represents a boundary line that would yield a packet loss based score that would be interpreted as good quality/health. The line 1107 represents a boundary line that would yield a packet loss based score that would be interpreted as very good quality/health. If the dimensions of a network path or circuit profile are different than the scoring component matrix, then adjustments can be made. For instance, weights across load bins for a same packet loss percentile can be averaged if the load bins of a scoring component matrix are at a greater resolution than a packet loss profile of a network path. If the load bins of the scoring component matrix are at a lower resolution than the packet loss profile, then weights across different, adjacent percentiles that map to a same load bin in the scoring component matrix can be averaged.

At block 317, the scoring system aggregates the scoring component with previously obtained scoring components. For instance, the scoring system updates a cross-utilization sum with the scoring component obtained from the scoring component matrix. Embodiments can scale or aggregate scoring components to reconcile differences in resolution. Embodiments can bias the aggregating to emphasize the scoring components at higher circuit load and/or de-emphasize the scoring components at lower loads. Biasing can be implemented by with varying magnitude of scoring components and/or applying bias coefficients.

At block 319, the scoring system determines whether there is another circuit utilization bin with corresponding data to process. If so, operational flow returns to block 311. If not, operational flow proceeds to block 321.

At block 321, the scoring system scores the circuit based on an aggregate of the scoring components. Assuming a scoring scale from 0-100 for both scoring and the scoring components, the scoring system can compute an average of the scoring components that formed the non-zero boundary. However, implementations can utilize different types of scoring components. For example, the scoring components can be partial scores that are summed to yield a circuit score. To illustrate, each scoring component may be a value from −1 to 0 for circuit profiles with a circuit utilization bin resolution that varies in granularity as mentioned earlier and a circuit scoring scale from 0 to 100. With 27 bins, the scoring system would sum the scoring components across the 27 bins that form the non-zero boundary.

Description of the example operations for circuit scoring based on packet loss data refer to ingress packet loss data. A circuit, whether physical or virtual, is likely bidirectional. Thus, the data is tracked in each direction—ingress and egress. When scoring a circuit, a scoring system may present both scores—the circuit score based on the ingress data and a circuit score based on the egress data. A scoring system can instead calculate both scores and score the circuit based on both scores. This can be another aggregation (e.g., averaging the ingress and egress scores) or selection (e.g., selecting the lower score).

FIG. 6 is a flowchart of example operations for scoring a network path based on latency observations/values observed across circuit utilizations. The description of FIG. 6 presumes that program code corresponding to the example operations that can access time-series latency data (e.g., by querying a database). The operations of FIG. 6 can be considered as corresponding to 207 of FIG. 2 with the time-series data being time-series latency data and scoring of a network path. Implementations can present a network path score or aggregate scores of network paths of a circuit to generate a circuit score.

At block 601, the scoring system determines time-series latency data collected for a network path. Determining the time-series latency data may be determining an identifier of the network path to access the corresponding time-series data in a repository. Embodiments may download or retrieve the time-series data. In the case of scoring a circuit based on multiple network paths corresponding to a circuit, the latency data is aggregated into a latency dataset for the circuit and organized by circuit capacity utilization.

At block 603, the scoring system determines capacity utilization of a circuit corresponding to the network path at each time interval within a time window of the time-series latency data. The scoring system accesses or obtains time-series data in a same time window (e.g., matching timestamps) as the time window of the latency data. The scoring system determines the amount of data transmitted and received in each time interval (e.g., each minute) and calculates utilization/load. In the case of the network path being a network path provisioned on circuit, the scoring system aggregates the ingress load and the egress load of the circuit that supports the network path resulting in load buckets that range from 0 to 200 since each load can range from 0 to 100 percent. If the ingress/egress bandwidths are the same, the loads can be added together to aggregate. If the ingress/egress bandwidth capacities of a circuit are different, the load of the higher bandwidth capacity is normalized before aggregation with the load of the lower bandwidth capacity. Normalization accounts for the differing proportional impact of load on additional latency when capacities are different. To facilitate capacity agnostic scoring, the scoring system scores with respect to load in terms of percentage of the aggregated circuit capacity. Assuming the ingress bandwidth is greater and representing ingress load as i_load, normalized load would be computed as w*i_load+ e_load. To illustrate, assume bandwidths of x=50 and y=10. With these bandwidths, w=0.2. Assuming ingress load of 15% and egress load of 30%, normalized load would be computed as 33%. If multiple network paths corresponding to a same circuit are being scored, then the scoring can use the same normalized load for scoring each of the network paths.

At block 604, the scoring system determines a base latency(ies) for the network path. The network paths associated with the circuit can have different base latencies and added latencies. Quantifying quality of the circuit based on latency data uses the additional latency or latency offset between the base latency and the observed latency. The base latency depends upon distance (physical or logical) between the endpoints that define a network path. While base latency may be initially defined, base latency for a network path can change over time (e.g., route changes can impact the base latency). Different techniques can be used to determine base latency depending upon preferences for the scoring system. Choice of technique can depend upon bias between accuracy and resource conservation. For example, a single representative base latency can be selected for determining base latency offset from the observations across the selected time-series data. As an example, a resource conservative approach selects a latency of a percentile (e.g., $10^{th}$ or $20^{th}$ percentile) from the historical time-series data being used to score, and uses this selected latency as the base latency for determining the base latency offset. This could be facilitated, for example, by using a statistical query on the dataset.

Embodiments may use multiple base latencies to capture route changes over the course of time corresponding to the time-series data. For example, embodiments may segment the time-series latency data based on detected/suspected route change and calculate base latency offset in each segment with the base latency of the segment. Embodiments may use a more accurate but more computationally demanding technique to determine base latency that measures base latency at a finer granularity of time interval. The base latency for the network path is preferably measured under no load conditions (e.g., <1% load). With no load conditions, the base latency is primarily a function of the (physical or logical) distance between the endpoints of the network path. When available, sufficient samples occurring in no load conditions are used to measure the latency and used as a base latency for a current scoring interval. When sufficient no load condition samples are not available, the scoring system can be configured to use a latency of a different load range/bin as base latency. The selection of load bin is based on a lowest load bin with sufficient samples. This determination of base latency allows for scoring to adjust to route changes. Determining the base latency involves determining a base load bin. The system will bin latency observations by load. The load bins can be a consistent granularity or increase in granularity at higher loads. The system tracks moving average latency (e.g., weighted moving average or smoothed moving average) for each load bin. The lowest load bin with sufficient latency samples is selected as the base load bin and the corresponding latency used as the base latency. The criteria for sufficiency (e.g., >=1000 samples) are configurable and can be tuned.

At block 605, the scoring system calculates latency offset for each observation/sample with respect to the base latency. Example data in FIG. 7 illustrates the latency samples of different network paths for a circuit.

FIG. 7 depicts a subset of latency data delineated by tunnel with corresponding base latency offset (or additional latency) calculated for each observation. A latency data subset 701 provides a snapshot of latency samples/observations for two tunnels provisioned on circuit_A. The latency data subset 701 is depicted in a tabular format with several rows of samples per tunnel and 8 columns. The columns from left to right are labeled circuit_name, down_bw_mbps, up_bw_mbps, tunnel_name, time, rtt, base_rtt, and additional_latency. The column circuit_name includes an identifier of a circuit, which in this example is circuit_A. The columns down_bw_mbps and up_bw_mbps respectively include download bandwidth capacity and upload bandwidth capacity of the identified circuit. In this example, the capacities are the same across tunnels, but this is not necessarily the case in all configurations. The column tunnel_name includes identifiers of the tunnels: tunnel_1 and tunnel_2. The column time includes a series of 1 minute time intervals within a time window of the time-series latency data. The time intervals are the same across the tunnels in this illustration. The column rtt includes rtt values at each time interval for each tunnel. The column base_rtt includes the base rtt for each tunnel: 63 milliseconds (ms) for tunnel_1 and 107 ms for tunnel_2. The column additional_latency includes the difference between the latency observation and the base rtt for each tunnel at each time interval. Using the first row as an example reading, an additional latency of 2.7 ms was observed for tunnel_1 based on an rtt of 65.7 ms and a base rtt of 63 ms at a time interval beginning at "2020-11-03 13:00:00" and ending at "2020-11-03 13:00:59."

Returning to FIG. 6, the scoring system groups the samples with calculated latency offsets by load bin based on timestamps at block 608. Implicitly, the time of a latency sample is the time of the latency offset. Thus, a latency offset for a sample is grouped into a load bin based on the timestamp of the sample.

FIG. 8 depicts a subset of latency data with additional latencies grouped by circuit utilization bins based on timestamps of samples. A latency dataset 801 is presented in tabular format with latency samples and the corresponding additional latency values grouped by circuit utilization bin. The scoring system determined circuit load of 1% over the time intervals beginning at "2020-11-03 13:06:00," "2020-11-03 13:08:00," and "2020-11-03 13:09:00." The scoring system determined circuit load of 2% over the time intervals beginning at "2020-11-03 03 13:05:00" and "2020-11-03 13:07:00." The scoring system determined circuit load of 4% over the time intervals beginning at "2020-11-03 13:02:00" and "2020-11-03 13:03:00." The scoring system determined circuit load of 12% over the time intervals beginning at "2020-11-03 13:00:00," "2020-11-03 13:01:00," and "2020-11-03 13:04:00." Table 2 below indicate the groupings.

TABLE 2

Additional latencies per tunnel grouped by circuit utilization

| Circuit Utilization Bin | Tunnel | Additional Latencies (ms) |
|---|---|---|
| 1 | 1 | 0.8, 0.7, 0.7 |
| 1 | 2 | 0, 0, 0.3 |
| 2 | 1 | 1.0, 0.8 |
| 2 | 2 | 0,0 |
| 4 | 1 | 1.0, 1.0 |
| 4 | 2 | 0.3, 0.3 |
| 12 | 1 | 2.7, 1.0, 15.0 |
| 12 | 2 | 15.8, 0, 15.3 |

At block 609, the scoring system builds a circuit latency profile for the circuit. The scoring system builds the circuit latency profile with per circuit utilization bin percentiles of the additional latencies. In addition, the scoring system determines the expected additional latency per circuit utilization bin or per load bin. With added latency known/determined for a network path at no or low load, the scoring system can use a multiplier to determine the expected additional latency per load bin. For example, the expected additional latency is calculated based on expert knowledge of buffer sizes in bandwidth shapers and the bandwidth capacity of a circuit. An example circuit latency profile based on additional latencies is depicted in FIG. 9.

FIG. 9 depicts a circuit latency profile built from example latency data. A circuit latency profile 901 is depicted in a tabular format with a row for each circuit utilization percentage bin. Bins for lower percent circuit utilizations (e.g., less than 20%) encompass smaller sub-ranges in the 0-100 range. This design choice is made since magnitude of variation in additional latency at lower loads (e.g., 5% compared to 10% load) is substantially smaller than the magnitude of variation in additional latency at higher loads (e.g., 70% compared to 75% load). In this illustration, a bin encompasses each 1% sub-range from 0% to 10%, then 12%, 14%, 16%, 18%, 20%, 25%, 30%, 35%, 40%, 45%, 50%, 60%, 70%, 80%, and 90%. To illustrate, the load bin 80% includes samples observed at a load greater than or equal to 80% and less than 90%. The columns of the circuit profile 901 include mean, median, and various percentiles. The two rightmost columns from left to right include the numbers of observations/samples grouped into each bin and the expected delay (i.e., expected additional delay) for each bin. A negative additional latency would indicate a sample with an rtt less than the base rtt.

Returning to FIG. 6, the scoring system selects from the circuit latency profile a subset of the load bins corresponding to a defined capacity utilization ceiling and samples threshold at block 611. Although embodiments can choose to consider the latency information across all load bins, these example operations select a subset to reduce the amount of suspected noise that can impact scoring. Expert knowledge and/or domain experience guides defining the capacity utilization ceiling based on expectation/knowledge that higher loads cause more unstable latency behavior. The samples threshold is another experience/knowledge based configuration to ensure minimum threshold of samples is considered in the scoring. Assuming a ceiling of 70% and a samples threshold of 5%, the scoring system selects the 60% load bin since it encompasses samples at loads <70% and >=60%. The scoring system continues to select each successively lower load bin until the samples threshold is satisfied. In this case, the scoring system selects the bins 60%-20%.

At block 613, the scoring system determines an "actual latency offset" and an "expected latency offset" for the selected load bins. The scoring system calculates the actual latency offset as the mean of the means of latency offsets and the expected latency offset as the mean of expected delays. The means are weighted according to proportion of total samples in that utilization or load bin. Thus, the actual latency offset is a weighted average of the average additional latencies across load bins. In this illustration, the expected latency offset is also calculated as a weighted average. Using the above example of selecting the load bins 20%-60% from the profile shown in FIG. 9, the actual latency offset is calculated as 4.61 and the expected latency offset is calculated as 2.86, which is depicted in Table 1 below.

Latency or additional latency based circuit scoring can be used as a trigger to investigate whether latency issues are due to a capacity underutilization issue (e.g., a misconfiguration). If a circuit (or tunnel provisioned on the circuit) has a poor latency score, then additional analysis can be performed and/or re-scoring. Embodiments may rescore a network path to improve accuracy if the health score does not satisfy a low score threshold (e.g., <=a defined threshold delineating a scored considered as poor). For example, a scoring system may score a network base with a single representative base latency. If the score is considered low or poor, then the scoring system can re-score based on a more accurate base latency(ies). In addition or in alternative to rescoring, additional metrics may be analyzed, e.g., application bulk flow throughput and circuit utilization.

Figure 10:
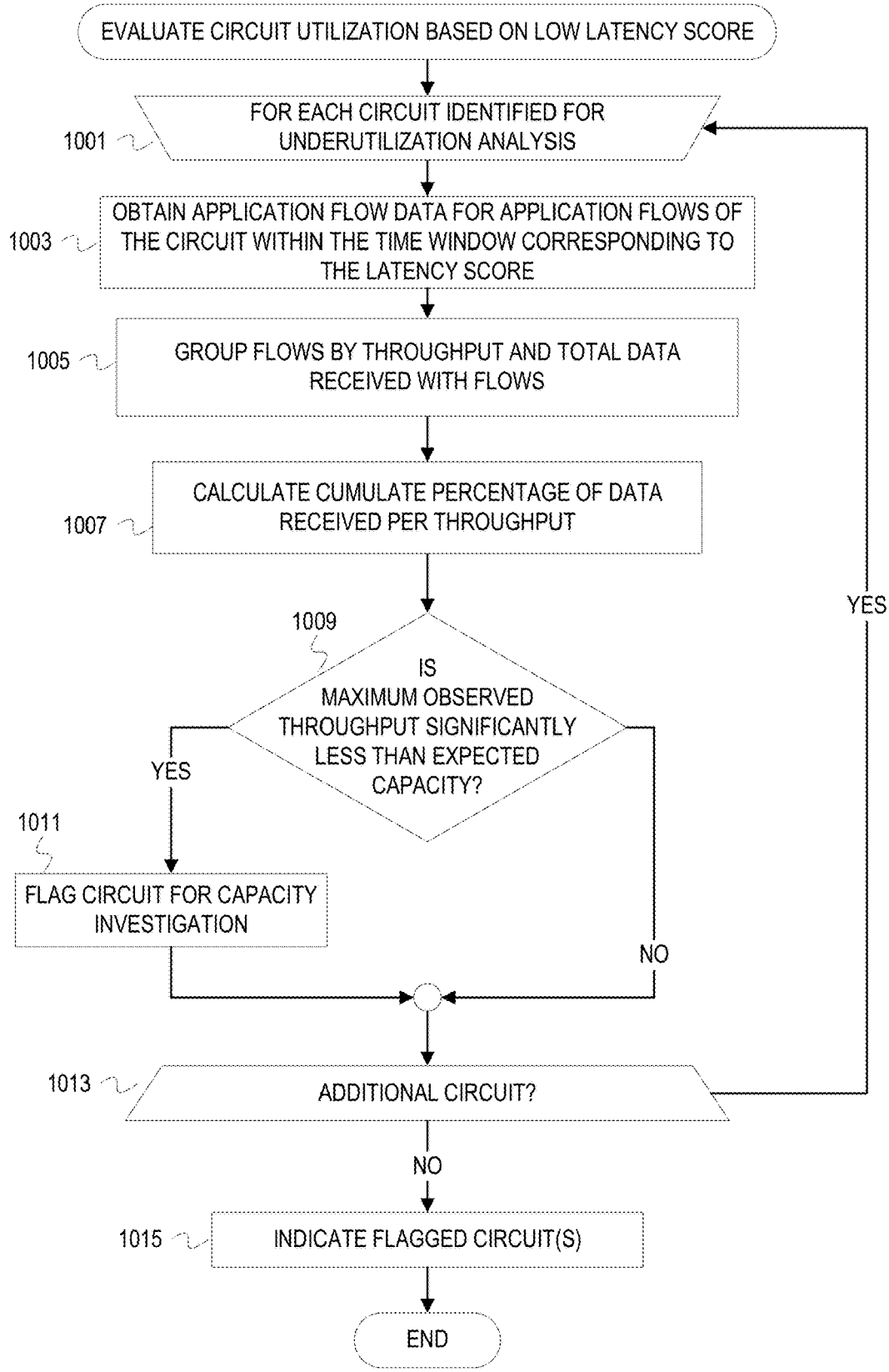
FIG. 10 is a flowchart of example operations for evaluating circuit utilization based on a low latency circuit score.

FIG. 10 is a flowchart of example operations for evaluating circuit utilization based on a low latency circuit score. While latency issues can be transient, circuit scoring based on observed additional latencies can aid in identifying a circuit utilization problem that is not readily apparent. This identification for investigation uses the latency based scoring as an initial trigger to analyze other aspects that collectively indicate underutilization of circuit capacity. While the example operations of FIG. 10 are described with reference to a scoring system for consistency with the preceding description, a different system may perform the analysis based on a circuit score provided from a scoring system.

At block 1001, a scoring system begins processing data for each circuit identified for underutilization analysis. The threshold that separates a low score from an acceptable score is a configurable threshold that can be set based on knowledge about the network(s) or circuits. This threshold can be adjusted over time based on current or recent state of the network(s). Moreover, the criterion for a circuit to investigate for underutilization may involve analysis of the circuit profile. For example, a low latency score can invoke ana-

TABLE 1

| circuit_name | down_bw | up_bw | mean_additional_delay | mean_expected_delay | ratio | util_percent |
|---|---|---|---|---|---|---|
| circuit A | 98 | 98 | 4.61 | 2.86 | 1.61 | 20 |

At block 615, the scoring system scores the circuit based on a ratio of the actual latency offset to the expected latency offset. For example, the scoring system can score the system as a function of the actual latency offset within a range defined by the expected latency offset and a poor latency offset threshold. Assuming that the poor latency offset threshold has been set as twice the expected latency offset, then scoring can be calculated according to the following:

ratio=actual latency_offset/expected_latency_offset score=(2−ratio)*100.

The expression to compute the score uses the coefficient for determining the upper threshold (the poor latency offset threshold) of the range with respect to the expected offset latency. The poor latency offset threshold is chosen so that an actual latency offset at or beyond the poor latency offset threshold will score very poorly, in this case a 0. The scoring can be capped to constrain scoring on a 0-100 scale. In the example calculations depicted in Table 1, the ratio is 1.61. Using the example of the upper additional latency threshold being twice the expected latency offset and the values in Table 1, the score would be 39.

lytical program code that evaluates the circuit profile of the low scoring circuit. A rule can be defined that excessive latency (e.g., additional latency greater than 10 ms) occurring at the $50^{th}$ percentile of additional latency for circuit load below 30% and with maximum circuit utilization less than 50% triggers evaluation of application flow data. Using the latency score and possibly circuit profile evaluation allows resources for further analysis to be conserved.

At block 1003, the scoring system obtains application flow data for application flows of the circuit. The scoring system can query a same repository from which network communication quality metric data was obtained or a different repository. The scoring system can request the data from a SD-WAN controller in communication with the scoring system. The scoring system requests application flow data in a time window that is the same or approximately the same as the time window of the latency data that is the basis for the low circuit score. The scoring system can query with criteria to obtain data informative for the investigation. For example, the scoring system can request application flow data of flows that carried at least 10 megabytes of data and had a duration of at least 1 second.

At block 1005, the scoring system groups flows by throughput and computes data transmitted in total and per grouping. The scoring system groups the flows by throughput interval and then sums the data transmitted in each grouping to allocate data transmission by throughput. The scoring system also computes the total data transmitted to facilitate statistical analysis of throughput.

At block 1007, the scoring system calculates cumulative percentage of data transmission per throughput. With the data transmitted values for all flows and flow grouping, the scoring system can calculate the cumulative percentage of the total transmitted data at increasing intervals of the previously determined throughput groups.

Table 2 and Table 3_depicts example throughput statistics for a circuit. The data has been broken into Table 2 and Table 3 due to constraints of page size. Table 3 depicts the throughput statistics in a single row of cumulative percentages of total data transmitted across 11 throughput intervals. As indicated in Table 2, the throughput statistics are for a circuit_B. Table 2 and Table 3 together include 15 columns labeled as down_bw_mbps, up_bw_mbps, num_bulk_flows, ingress_bytes_MB, and mbps_0 to mbps_10 representing interval steps of 1 mb/s. The column down_bw_mbps indicates a receive circuit capacity of 100 mb/s and the up_bw_mbps indicates a transmit circuit capacity of 10 mb/s. The column num_bulk_flows indicates a number of application bulk flows (225 in this illustration) represented in the underlying data. The querying or requesting criteria in this example presumably limited the returned application flows to those that satisfied a "bulk" criterion. The column ingress_bytes_MB indicates the total amount of data received on circuit_B in the 225 application flows in the time window of the corresponding latency data—11320.9 megabytes. The column mbps_0 indicates the percentage of the ingress_bytes_MB received at a throughput greater than 0 mb/s, which is 100%. The column mbps_1 indicates the percentage of the ingress_bytes_MB received at a throughput greater than 1 mb/s, which is 90%. Based on the last 2.4% of the 11320.9 MB of data being received at a rate greater than 9 mb/s and less than or equal to 10 mb/s, throughput for the circuit seems to have not exceeded 10 mb/s during the time window of the data. With an indicated capacity of 100 mb/s, the statistics reveal a significant underutilization of the configured capacity.

cate a configuration issue or a problem with the circuit bandwidth capacity provided by a network service provider. Otherwise, operational flow proceeds to block 1013.

At block 1011, the scoring system flags the circuit for capacity investigation. A flag or value can be set in a data structure entry corresponding to the circuit.

At block 1013, the scoring system determines whether there is another identified circuit. If there is an additional circuit identified for underutilization analysis, operational flow returns to block 1001. Otherwise, operational flow proceeds to block 1015.

At block 1015, the scoring system indicates the flagged circuit(s), if any. A user interface can be updated to indicate a label/name for the flagged circuit or update a graphical representation to indicate a circuit for investigation (e.g., with coloring). The scoring system can generate a notification or update a file to indicate the flagged circuit(s).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the traversal/iterative operations in FIGS. 3 and 6 can be performed from a different dimension. The scoring system does not necessarily traverse a circuit profile from the circuit utilization dimension. The scoring system could traverse from the percentiles dimension. For example, the scoring system could iterate over each percentile from the lowest percentile and locate each bin having a non-zero network communication quality metric observation. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including

TABLE 2

| circuit_name | down_bw_mbps | up_bw_mbps | num_bulk_flows | ingress_bytes_MB |
|---|---|---|---|---|
| circuit B | 100 | 10 | 225 | 11320.9 |

TABLE 3

| mbps0 | mbps1 | mbps2 | mbps3 | mbps4 | mbps5 | mbps6 | mbps7 | mbps8 | mbps9 | mbps10 |
|---|---|---|---|---|---|---|---|---|---|---|
| 100 | 90 | 74.2 | 56.3 | 42.1 | 38.2 | 35.5 | 26.7 | 23.9 | 7.5 | 2.4 |

At block 1009, the scoring system determines whether the maximum observed throughput (or maximum throughput interval) is significantly less than the configured capacity of the circuit. Significance is defined with a threshold (e.g., relative threshold—more than 50% deviation from capacity). If the maximum observed throughput is significantly less than the configured capacity, then operational flow proceeds to block 1011. Excessive additional latency at low load combined with low maximum circuit utilization and low single flow throughput indicate that actual circuit bandwidth is lower than configured bandwidth. This could indifirmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 12:
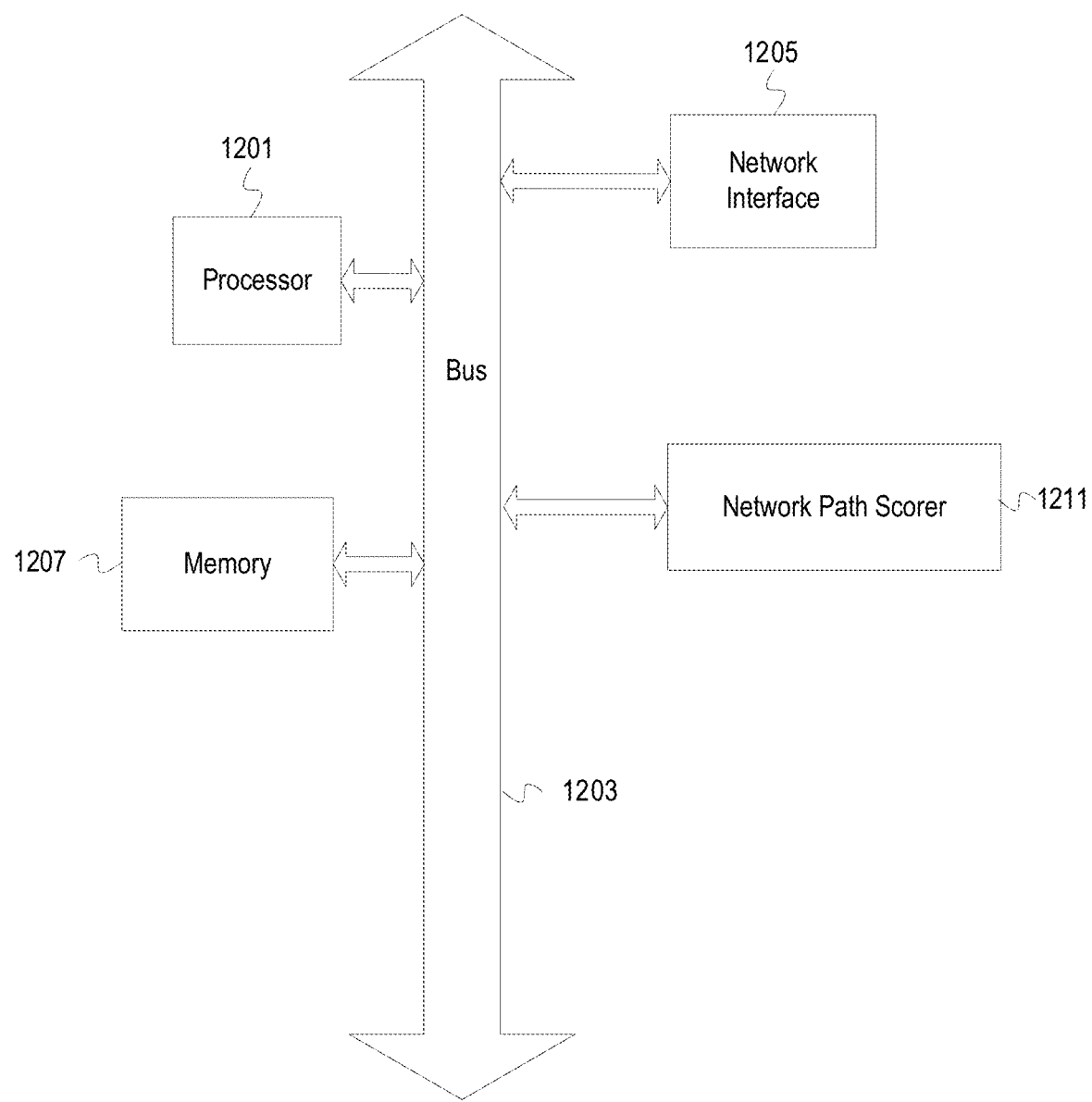
FIG. 12 depicts an example computer with a network path scorer.

FIG. 12 depicts an example computer with a network path scorer. The computer includes a processor 1201 (possibly including multiple processors, multiple cores, multiple nodes, and/or implementing multi-threading, etc.). The computer includes memory 1207. The memory 1207 may be system memory or any one or more of the above already described possible realizations of machine-readable media. The computer also includes a bus 1203 and a network interface 1205. The computer also includes network path scorer 1211. The network path scorer 1211 builds a profile for a network path (e.g., a circuit) from time-series network communication quality metric data as described variously above. The network path scorer 1211 then scores a network path for packet loss based on scoring components in a scoring component structure having same or similar dimensions as the network path profile based on a boundary across the profile that is defined by best observations of the network communication quality data. For latency based scoring, the network path scorer 1211 scores a network path or circuit based on a ratio of a representative observed base latency offset and a representative expected base latency offset. The representative observed base latency offset is a mean of the means of additional latencies of a selected set of load bins. The representative expected base latency offset is a mean of the means of expected additional latencies of the selected set of load bins. Any one of the previously described functionalities may be partially (or entirely) implemented in hardware and/or on the processor 1201. For example, the functionality may be implemented with an application specific integrated circuit, in logic implemented in the processor 1201, in a co-processor on a peripheral device or card, etc. Further, realizations may include fewer or additional components not illustrated in FIG. 12 (e.g., video cards, audio cards, additional network interfaces, peripheral devices, etc.). The processor 1201 and the network interface 1205 are coupled to the bus 1203. Although illustrated as being coupled to the bus 1203, the memory 1207 may be coupled to the processor 1201. The network path scorer 1211 can communicate a circuit score to another system or subsystem for investigation of potential systemic issues indicated by low scores.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
based on time-series latency data of a network path, determining observed additional latencies with respect to a base latency of the network path;
determining load of each of a plurality of time intervals of the time-series latency data;
binning the observed additional latencies by load;
determining an observed additional latency average for each load bin;
determining an average of the observed additional latency averages of a subset of the load bins;
determining an average of expected additional latencies of the subset of the load bins; and
scoring health of the network path based, at least in part, on the average of the observed additional latency averages and the average of expected additional latencies.

2. The method of claim 1 further comprising determining the base latency for the network path for a time period of the time-series latency data.

3. The method of claim 2, wherein determining the base latency comprises selecting a latency of a specified percentile of latency of the time-series latency data across the time period.

4. The method of claim 3, further comprising:
determining whether the score is below a first threshold defined as indicating a low score;
based on determining that the score is a low score, identifying a lowest of the load bins with a subset of the observed additional latencies that satisfies a sufficiency criterion and updating the base latency to the observed additional latency average of the identified load bin;
determining second observed additional latencies with respect to the updated base latency;
binning by load the second observed additional latencies;
determining a second observed additional latency average for each load bin with the second observed additional latencies;
determining an average of the second observed additional latency averages of a subset of the load bins; and re-scoring health of the network path based, at least in part, on the average of the second observed additional latency averages and the average of expected additional latencies.

5. The method of claim 2, wherein determining the base latency comprises identifying a lowest of the load bins with a subset of the observed additional latencies that satisfies a sufficiency criterion and setting the base latency to the observed additional latency average of the identified load bin.

6. The method of claim 1, wherein determining load of each of the plurality of time intervals of the time-series latency data is based, at least in part, on ingress and egress loads corresponding to the network path.

7. The method of claim 6 further comprising determining the ingress and egress bandwidths of a network circuit associated with the network path, normalizing the load corresponding to the larger of ingress and egress bandwidths, and aggregating the ingress and egress loads after normalization, wherein determining the load is based on the aggregated ingress and egress loads.

8. The method of claim 1, wherein scoring health of the network path comprises determining a ratio of the average of the observed additional latency averages and the average of expected additional latencies.

9. The method of claim 1 further comprising scoring health of a second network path based, at least in part, on average of observed additional latency averages of the second network path and an average of expected additional latencies of the second network path, wherein the observed additional latency averages of the second network path are with respect to a base latency of the second network path.

10. The method of claim 9 further comprising scoring health of a network circuit corresponding to the first and the second network paths, wherein scoring the health of the network circuit is based, at least in part, on scores of the first and second network paths.

11. The method of claim 1 further comprising identifying the network path for bandwidth underutilization analysis based on the score of the first network path being below a poor score threshold and calculating throughput statistics for the network path based on application flow data to determine a maximum observed bandwidth utilization.

12. A non-transitory, machine-readable medium having program code stored thereon, the program code comprising instructions to:
determine observed additional latencies with respect to a base latency of a network path based on time-series latency data of the network path;
determine circuit load of each of a plurality of time intervals of the time-series latency data based, at least in part, on both ingress and egress loads;
bin the observed additional latencies into corresponding ones of a plurality of load bins based, at least in part, on the determined circuit loads;
determine an observed additional latency average for each of the plurality of load bins;
determine an average of the observed additional latency averages of at least a subset of the plurality of load bins;
determine an average of expected additional latencies of the subset of the load bins; and
score health of the network path based, at least in part, on the average of the observed additional latency averages and the average of expected additional latencies.

13. The non-transitory machine-readable medium of claim 12, wherein the instructions to score health of the network path comprise instructions to determine a ratio of the average of the observed additional latency averages and the average of expected additional latencies.

14. The non-transitory machine-readable medium of claim 12, wherein the program code further comprises instructions to determine the base latency for the network path for a time period of the time-series latency data.

15. The non-transitory machine-readable medium of claim 14, wherein the instructions to determine the base latency comprise instructions to select a latency of a specified percentile of latency of the time-series latency data across the time period.

16. The non-transitory machine-readable medium of claim 15, wherein the program code further comprises instructions to:
determine whether the score is below a first threshold defined as indicating a low score;
based on a determination that the score is a low score, identify a lowest of the plurality of load bins with a subset of the observed additional latencies that satisfies a sufficiency criterion and update the base latency to the observed additional latency average of the identified load bin;
determine second observed additional latencies with respect to the updated base latency;
bin by circuit load the second observed additional latencies;
determine a second observed additional latency average for each of the plurality of load bins with the second observed additional latencies;
determine an average of the second observed additional latency averages of a second subset of the plurality of load bins; and
re-score health of the network path based, at least in part, on the average of the second observed additional latency averages and the average of expected additional latencies.

17. The non-transitory machine-readable medium of claim 14, wherein the instructions to determine the base latency comprise instructions to identify a lowest of the load bins with a subset of the observed additional latencies that satisfies a sufficiency criterion and set the base latency to the observed additional latency average of the identified load bin.

18. The non-transitory machine-readable medium of claim 12, wherein the program code further comprises instructions to determine the ingress and egress bandwidths of a network circuit associated with the network path, normalize the load corresponding to the larger of ingress and egress bandwidths, and aggregate the ingress and egress loads after normalization, wherein the instructions to determine the circuit load comprise the instructions to determine the circuit load based on the aggregated ingress and egress loads.

19. The non-transitory machine-readable medium of claim 12, wherein the program code further comprises instructions to identify the network path for bandwidth underutilization analysis based on the score of the first network path being below a poor score threshold and to calculate throughput statistics for the network path based on application flow data to determine a maximum observed bandwidth utilization.

20. An apparatus comprising:
a processor; and
a machine-readable medium having instructions stored thereon that are executable by the processor to cause the apparatus to, determine observed additional latencies with respect to a base latency of a network path based on time-series latency data of the network path;

determine circuit load of each of a plurality of time intervals of the time-series latency data based, at least in part, on both ingress and egress loads;

bin the observed additional latencies into corresponding ones of a plurality of load bins based, at least in part, on the determined circuit loads;

determine an observed additional latency average for each of the plurality of load bins;

determine an average of the observed additional latency averages of at least a subset of the plurality of load bins;

determine an average of expected additional latencies of the subset of the load bins; and score health of the network path based, at least in part, on the average of the observed additional latency averages and the average of expected additional latencies.

21. The apparatus of claim 20, wherein the program code further comprises instructions to determine the base latency for the network path for a time period of the time-series latency data.

22. The apparatus of claim 21, wherein the instructions to determine the base latency comprise instructions to select a latency of a specified percentile of latency of the time-series latency data across the time period.

23. The apparatus of claim 22, wherein the program code further comprises instructions to:
determine whether the score is below a first threshold defined as indicating a low score;
based on a determination that the score is a low score, identify a lowest of the plurality of load bins with a subset of the observed additional latencies that satisfies a sufficiency criterion and update the base latency to the observed additional latency average of the identified load bin;

determine second observed additional latencies with respect to the updated base latency;

bin by circuit load the second observed additional latencies;

determine a second observed additional latency average for each of the plurality of load bins with the second observed additional latencies;

determine an average of the second observed additional latency averages of a second subset of the plurality of load bins; and re-score health of the network path based, at least in part, on the average of the second observed additional latency averages and the average of expected additional latencies.

24. The apparatus of claim 21, wherein the instructions to determine the base latency comprise instructions to identify a lowest of the load bins with a subset of the observed additional latencies that satisfies a sufficiency criterion and set the base latency to the observed additional latency average of the identified load bin.

25. The apparatus of claim 20, wherein the instructions to score health of the network path comprise instructions to determine a ratio of the average of the observed additional latency averages and the average of expected additional latencies.

* * * * *